United States Patent Office 3,567,481
Patented Mar. 2, 1971

3,567,481
FIBROUS CATIONIC MINERAL PIGMENT
William L. Craig, Westport, Conn., assignor to R. T. Vanderbilt Company, Inc., New York, N.Y.
No Drawing. Filed June 5, 1968, Ser. No. 734,581
Int. Cl. C09c 1/02, 3/00
U.S. Cl. 106—306                                       8 Claims

ABSTRACT OF THE DISCLOSURE

An improved complex silicate pigment is disclosed prepared by precipitating a complex silicate pigment on cationic fibrous magnesium or magnesium-aluminum silicates. The ratio of the fibrous silicate to pigment is between about 50:50 and 97:3 by weight. The properties of papers manufactured using the improved pigment of this invention are described.

---

This application concerns an improved alkaline earth-silicate pigment complex for use in paper, paint, rubber, textiles, plastics and ceramics. More particularly, it concerns an improved pigment in which the pigment complex is deposited in, on and around fibrous magnesium silicates or magnesium-aluminum silicates.

Complex calcium-organo-silicate pigments are known in the art, having been disclosed in my U.S. Pat. No. 2,573,677. They are prepared by first forming a starch-calcium chloride complex through the treatment of starch with a strong aqueous solution of calcium chloride. The pigment is precipitated by the addition of a dilute solution of sodium silicate having a high ratio of $SiO_2$ to $Na_2O$.

An improvement of the foregoing calcium-organo-silicate pigments are the calcium-organo-alumino-silicate pigments described in my U.S. Pat. No. 2,824,099. The improved calcium-organo-alumino-silicates are prepared by treating the precipitated calcium-organo-silicate with a minor proportion of alum. Ion exchange takes place to substitute a fraction of the calcium ions by aluminum ions, and thereby to form a more insoluble pigment which is retained better on fibers and possesses improved optical properties.

Still other complex alkaline earth pigments are disclosed in my U.S. Pat. No. 2,935,438. The pigments disclosed in this patent are prepared by reacting calcium halide and a soluble silicate under intense agitation to produce a finely divided precipitated hydrous calcium silicate. The precipitated silicate is treated with aluminum sulfate.

The advantages of this entire family of pigments, which are widely used in the paper industry, are their very small particle size, 0.02 micron as compared with 0.25 micron for titanium dioxide, and their porous structure, both of which contribute to enhanced optical properties. Experience in the use of these pigments has disclosed, however, that for best results the pigments should be stored wet until used. If the pigments are dried before use, the drying tends to fuse the pigment particles into agglomerates which can be redispersed only with great difficulty. As a consequence, the advantages accompanying the extremely small particle sizes of these pigments are largely lost. Accordingly, they are normally prepared on the premises of the paper mill where they are used, thus making necessary the investment to provide the equipment needed in the preparation and storage of these pigments.

In accordance with the present invention, it has now been found that the silicate pigment of the prior art can be further improved by plating it or complexing it on certain inorganic fibrous materials. The improved pigmented fiber of the present invention is prepared by first combining a solution of a member of the group consisting of halides of metals selected from the group consisting of calcium, barium, magnesium and aluminum and complexes thereof with starch containing from 1.58% to 15.8% starch and a dispersion of the fibrous magnesium silicate or magnesium-aluminum silicate. Thereafter, a soluble silicate is added to prepare the precipitated silicate pigment which is treated with aluminum sulfate to form the alumino-silicate pigment in the manner described in the above-mentioned U.S. Pats. No. 2,824,099 and No. 2,935,438.

In preparing the pigments of the present invention a metal halide and the fibrous silicate suspension may be combined in ratios appropriate to yield an end product in which the fibrous silicate carries from 3% to 50% of the silicate pigment (by weight, based on the combined weight of pigment plus fibrous silicate). The amounts of silicate and the aluminum salt added during the precipitation of the pigment are proportioned in accordance with the quantity of calcium halide used.

The fibrous minerals useful in the present invention, namely magnesium silicates and magnesium-aluminum silicates, are, of course, recognized as asbestos and fibrous talcs. These fibrous minerals are normally characterized by cationic surface sites. It is preferred, however, to employ asbestos fiber in the chrysotile form. Particularly good results are obtained if the chrysotile asbestos has been modified by opening up the fibrous structure and removing a portion of the magnesium oxide coating on the fibrils to provide a fiber having a greatly increased number of cationic sites for anion adsorption. Asbestos of this last-mentioned character is available commercially from the Union Carbide Corporation designated as "high purity" asbestos fiber.

One type of pigment contemplated for use in the present invention is described in detail in my above-mentioned U.S. Pat. No. 2,824,099. In summary, these pigments are prepared by first treating starch with a concentrated solution of calcium chloride. Typically, the temperature employed is in the order of 20°–140° F. and the calcium chloride solution is of a concentration of at least 25% by weight, based on the weight of the water and calcium chloride. The upper temperature limit depends on the gelatinization temperature of the starch employed. From about 1.58% to about 15.8% by weight starch, based upon the weight of calcium chloride, may be used. The reaction mixture is then dispersed in an aqueous slurry of the fibrous mineral. The diluted mixture is reacted with an aqueous solution of sodium silicate containing up to about 30% by weight sodium oxide plus silicon dioxide in a ratio such that the reacting mixture contains in the order of 1 gram atomic weight of combined calcium for each 3 to 5 gram molecular weights of combined silicon dioxide. The starch which may be used is any of a wide variety, including common starches such as potato starch, corn starch, wheat starch, etc.

The preferred pigments disclosed in the above-mentioned patent are prepared from a 45% calcium chloride solution and from about 3.15% to about 6.3% by weight starch based on the weight of calcium chloride. The sodium silicate employed has a sodium oxide to silicon dioxide mole ratio of at least about 1:3 and contains from about 5% to about 15% by weight sodium silicate.

Because of the high water binding capacity of the fibrous silicates, they cannot be practically utilized in concentrations of over about 2% by weight. Typically, the fiber slurry is in the order of 1% by weight fiber. When adding the calcium halide-starch complex, therefore, in an amount sufficient to provide from 3% to 50% pigment on the fiber, the concentration of calcium in the starting pulp slurry will ordinarily be a fraction of a percent.

The pigmented fibers formed by the foregoing process are then treated with a solution of aluminum sulfate in such a manner as to provide a finished reaction product which is characterized by a pH within the range of about 7.5 to 10 when dispersed in water at a concentration of about 1% by weight. Typically, a 10% by weight aqueous solution of aluminum sulfate will be employed in an amount sufficient to provide in the order of 4 to 7 pounds of air-dry aluminum sulfate for each 10 pounds of the calcium-organo-silicate complex. The aluminum sulfate treatment may be carried out at temperatures as high as 130°–140° F. if desired; however, these high temperatures are not needed.

For a fuller description of the calcium-organo-aluminosilicate complex pigments reference may be made to my aforementioned U.S. Pat. No. 2,824,099, the disclosure of which is hereby incorporated by reference.

It is preferred to form the complex silicate so as to produce minimum particle sizes. In general, smaller particle sizes are obtained at higher reaction temperatures and lower concentrations of reactants. However, practical considerations limit the temperature to temperatures lower than those at which the starch hydrolyzes. Since high temperatures cannot be used, high shear mixing is used to produce small particles from dilute reactants.

Laboratory preparations are conveniently prepared in a Waring Blendor modified in such a way that the reactants are introduced directly on the shear head. The mineral fibers required in the order of one minute of high shear mixing in the Waring Blendor for thorough wetting out and hydration. An additional minute of agitation is required to combine and plate out the calcium chloride-starch complex on the hydrated mineral fibers. Sodium silicate is added more slowly and agitated for a total of two minutes. The alum solution is added and mixed for a further two minutes. The slurry thus formed is recovered as a filter cake and may be dried or otherwise worked up as convenient for further use.

In continuous plant scale operations, high shear mixing may be obtained by pumping a slurry of the mineral silicates fiber through a high speed motor pump operating at 7000–8000 r.p.m. The calcium chloride-starch complex is injected into the shear head of the pump as the sodium silicate solution subsequently is added. The alum solution is introduced to the mixture under pressure at a third high-speed pump further downstream.

In a manner similar to the foregoing, wholly inorganic calcium-aluminum silicate pigments may be prepared following generally the process disclosed in my U.S. Pat. No. 2,935,438. These are prepared by substituting a calcium halide for the calcium halide-starch complex mentioned above on an equimolar basis. As pointed out in this patent, it is especially important in the case of the wholly inorganic silicate pigments to form the initial silicate precipitate under conditions of intense agitation. In lieu of calcium chloride referred to in Pat. No. 2,935,438, salts such as barium halides, magnesium halides or aluminum halides may also be used.

The present invention may be further understood by reference to the following examples:

EXAMPLE 1

A typical asbestos-calcium-organo-alumino-silicate pigment containing 70% by weight asbestos was prepared as follows: High purity grade asbestos fiber of the Union Carbide Corporation, 33.3 grams in 2200 ml. of distilled water was mixed in a Waring Blendor. Then 14.5 grams of calcium chloride-starch complex was added and mixed for an additional minute. A 10% sodium silicate solution, 176 ml., was then added slowly (over a 30-second period) directly to the shearing head while mixing and stirring at high speed was continued. Mixing continued for two minutes after the sodium silicate had been added. Thereupon 8.6 grams of iron-free alum dissolved in 100 ml. of tap water was added and mixing continued for an additional two minutes. The resulting slurry was filtered, washed thoroughly with distilled water, dried at 105° C. in an oven, and ground. Before use as the filler in handsheets, the pigment was wet-ground in a ball mill.

The calcium chloride-starch complex referred to above was prepared in accordance with the method described in U.S. Pat. No. 2,824,099. A 45% aqueous calcium chloride solution was prepared by mixing 727 grams of flaked calcium chloride (570 grams anhydrous) with 525 grams of distilled water, cooling to 140° F. and adding 29 grams of potato starch slurried in 29 ml. of distilled water. The mixture was maintained at 140° F. for 3 hours. The reaction mass was then stored at room temperature without further agitation for at least 8 hours.

In like manner, pigments containing various proportions of asbestos, calcium chloride-starch complex, sodium silicate and alum may be prepared. Using the procedure set forth in Example 1, the following pigments were prepared.

TABLE I

| Asbestos/pigment, Ratio | HP asbestos, grams | CaCl$_2$-starch complex, grams | Na silicate 10% soln., milliliters | Alum, iron-free, grams |
|---|---|---|---|---|
| 97/3 | 46.5 | 1.4 | 17.4 | 0.9 |
| 95/5 | 45.6 | 2.4 | 29.0 | 1.5 |
| 93/7 | 44.6 | 3.4 | 41.0 | 2.1 |
| 90/10 | 43.2 | 4.9 | 59.0 | 2.9 |
| 85/15 | 40.8 | 7.4 | 89.0 | 4.4 |
| 80/20 | 38.4 | 9.8 | 118.0 | 5.8 |
| 75/25 | 36.0 | 12.3 | 148.0 | 7.3 |
| 70/30 | 33.3 | 14.6 | 176.0 | 8.6 |

In each of the foregoing, the indicated amount of high purity asbestos was slurried in 2200 ml. of water and the remaining components added as described in Example 1. In each case the amount of alum specified was dissolved in 100 ml. of hot water.

It will be observed in the foregoing process that sodium chloride is formed as a by-product of the reaction between calcium chloride and sodium silicate. This salt has no deleterious effect on the calcium silicate complex and need not be washed out.

The use of pigments of the foregoing general description in paper making is illustrated by the following examples:

EXAMPLE 2

The pigments were used at 10% on the weight of dry paper fiber as the filler in a furnish prepared by treating 620 grams of bleached sulfite pulp having a Canadian freeness of 343 ml. air dry consistency of 3.23% with 1% of standard emulsified and saponified gum rosin (sodium rosinate), then 10% of the filler is added, and finally 2% of alum to set the rosin size and form cationic aluminum resinate which adheres to the fiber.

Handsheets were prepared in a British Standard handsheet former (TAPPI Test No. T–205) having a 150x150 wire screen. Approximately 600 cc. of furnish (measured exactly to provide a 50 lb. basis weight) was made up to 7200 ml., the first three handsheets being prepared with fresh portions of distilled water to produce "open system" handsheets equivalent to one pass, and the fourth to ninth with recirculated white water to produce "closed system" handsheets. After forming, each sheet was pressed for five minutes at 50 p.s.i., dried on a three-drum dryer with drums at 200° F., 250° F and 280° F., respectively, and, finally, conditioned at 73° F. and 50% relative humidity. (T–402)

Standard tests were performed on the handsheets including:

Basis weight in grams calculated from known area and weight obtained to 0.0001 gram to that corresponding to 500 sheets 25" x 38" in size.

Brightness by TAPPI Test No. T-452m-58 using a General Electric reflectometer with a Number 1 filter at 455μ), to determine blue-whiteness.

Opacity was measured on a Bausch and Lomb opacimeter, TAPPI Test No. T-425m-60.

Densometer value, the inverse of porosity, measured on a Gurley densometer, TAPPI Test No. T-460m-49, as the time in seconds required for 100 ml. of air at a pressure of 4.9 inches of water to pass through one square inch of paper.

Percent ignition loss and percent ash are determined by ashing paper of known weight for two hours in a 1680° F. muffle furnace with good air throughout and weighing the ash, TAPPI Test No. T-413ts-66.

Percent filler is calculated from ignition loss and the ignition loss characteristic of the particular filler present.

The pigment per se was tested as to:

Dry brightness by TAPPI Test No. T-646m-54 using the General Electric reflectometer described above.

pH on a 1 percent slurry in distilled water. (It was too thick at higher concentrations.)

Ignition loss for determining "percent" filler" of paper.

Pigment efficiency, closed, by a modification of the light scattering method described by Kubelka and Munk whose chart, a plot of TAPPI opacity, $C_{0.89}$, against reflectance $R_0$ or $R_\infty$, appears in TAPPI Data Sheet No. 65. Optical properties of hand sheets of known basis weight were determined, TAPPI capacity, $C_{0.89}$, using Bausch & Lomb opacimeter according to TAPPI Test No. T-425mm-60, and reflectance, $R_\infty$, using General Electric reflectometer according to TAPPI Test No. T-452m-58. The intersect of the values thus obtained was located on an extended Kubelka and Munk chart to determine the scattering coefficient, SX. The hand sheets were then ashed to determine percent ash, and pigment efficiency calculated from the ratio of scattering coefficient to percent ash:

$$\text{Pigment efficiency, closed} = \frac{SX}{\text{percent ash}}$$

Percent retention, closed, by the following steps:

(1)

$$\text{Percent filler ash} = \frac{(\text{percent total ash of filled sheet}) -}{(\text{percent total ash of unfilled sheet})}$$

(2)

Percent filler in sheet $$= \frac{(\text{percent filler ash})}{100 - (\text{percent filler ignition loss})} \times 100$$

(3)

Percent filler retention $$= \frac{(\text{percent filler in sheet})}{\left[\frac{(\text{percent filler added})}{100 + (\text{percent filler added})}\right] \times 100} \times 100$$

If the filler contains another material in addition to $TiO_2$, the percent $TiO_2$ by analysis is subtracted from the percent filler ash obtained in step 1 before proceeding to step 2. Then percent $TiO_2$ is added to percent filler from step 2 for computation according to step 3.

The first trials, 1, 2 and 5-8, were designed to determine whether the alum added during the formation of the pigment complex had any effect on the properties of the paper as well as to compare asbestos/pigment combinations in proportions of 70/30 with a commercial pigment formed by combining high purity asbestos with titanium dioxide in a 65/35 ratio.

In these trials, for control purposes, trial No. 1 was included as a sample of paper in which there was no added filler. In trial No. 2, high purity asbestos was employed as a filler without any pigment added thereto. In trial No. 8, high purity asbestos was "treated" in the manner described in Example 1 for producing an asbestos-pigment complex; however, in each step, water only was used—i.e., the calcium chloride-starch complex, sodium silicate and alum were omitted. The results are set forth in the following table:

TABLE II

| Trial Number | 1 | 2 | 8 | 6 | 7 | 5 |
|---|---|---|---|---|---|---|
| Pigmented fiber used | None | HP[1] 100%, as received | HP[1] 100%, treated blank | Organo-HP[1]/silicate complex, 70/30 No alum | Organo-HP[1]/silicate complex, 70/30 alum | HP[1]/TiO[2] 65/35 |
| Pigmented fiber, percent [2] | 0 | 10 | 10 | 10 | 10 | 10 |
| Tests on handsheets, 50 lb. basis weight: | | | | | | |
| Brightness, TAPPI | 81.7 | 79.2 | 80.7 | 83.1 | 84.6 | 84.1 |
| Opacity, TAPPI | 76.3 | 79.5 | 80.75 | 84.25 | 85.25 | 85.3 |
| Total ash, percent | 0.22 | 6.10 | 5.42 | 4.74 | 4.36 | 6.13 |
| Filler in sheet, percent | | 6.89 | 6.09 | 5.33 | 4.94 | { 6.59 [3] 1.94 |
| Dry pigment tests: | | | | | | |
| Ignition loss, percent | | 14.67 | 14.67 | 15.16 | 16.15 | 10.36 |
| Brightness, washed cake | | 80.5 | 78.3 | 85.5 | 86.2 | 88.9 |

[1] High purity treated asbestos from the Union Carbide Corporation.
[2] As used in this and subsequent examples, the weight percent of asbestos, asbestos plus precipitated pigment or asbestos plus TiO₂ added to the furnish was based on the weight of air-dried fiber content.
[3] TiO₂ by analysis.

Of particular interest in the foregoing is that at the asbestos/pigment ratio of 70/30, the brightness of the filled paper is higher than that of a paper filled with an equal loading of an asbestos/titanium dioxide pigment containing 35% titanium dioxide. The data also show that the presence of alumina in the pigment complex increases the brightness. The opacity of paper filled with the alum-treated pigments was superior to that of paper filled with the pigments prepared without alum and approached that of paper filled wih the asbestos/titanium dioxide pigment.

EXAMPLE 13

Trials 15, 18 and 19 are a comparison of a mechanical blend of asbestos and the calcium-organo-alumino-silicate pigment with pigments prepared in accordance with the present invention. Comparisons are made with the pigment both in the washed and unwashed condition. The data in Table II show that the optical properites, i.e. brightness and opacity, of pigments prepared in accordance with the present invention were superior.

TABLE III

| Trial | 15 | 18 | 19 |
|---|---|---|---|
| | Pigmented fiber used— * HP/organo-silicate complex—70/30 | | |
| | Mechanical blend | Mechanical blend, washed | Precipitated on fiber, not washed |
| Pigmented fiber added, percent | 10 | 10 | 10 |
| Tests on handsheets—50 lb. basis weight: | | | |
| Brightness, TAPPI | 82.8 | 82.6 | 82.0 |
| Opacity, TAPPI | 85.4 | 85.3 | 87.2 |
| Densitometer, sec./100 ml | | 95 | 114 |
| Total ash, percent | 6.39 | 6.57 | 5.30 |
| Filler in sheet, percent | 7.22 | 7.42 | 5.95 |

* High purity treated asbestos from the Union Carbide Corporation.

EXAMPLE 4

The optical properties of papers filled with the pigment of the present invention did not increase in proportion to the amount of pigment precipitated on the asbestos fiber. Trials were made using pigments containing smaller proportions of precipitated pigment on the fiber than had been used before. For comparison purposes, papers were made with an asbestos-titanium dioxide pigment at a 10% level and also at a 7% level, the latter to provide a paper in which the ash levels are more nearly comparable with the ash levels of papers embodying the pigments of the present invention. The results are set forth in Table IV.

TABLE IV

| Trial Number | 27 | 29 | 28 | 36 | 35 | 37 | 30 | 31 | 26 | 32 | 33 | 34 |
|---|---|---|---|---|---|---|---|---|---|---|---|---|
| | Pigment used | | | | | | | | | | | |
| | None | *HP/ TiO2 65/35 | Hi-purity asbestos fiber/organo-silicate complex, precipitated, Unwashed | | | | | | | | | *HP/ TiO2 65/35 |
| | | | 100/0 | 97/3 | 95/5 | 93/7 | 90/10 | 85/15 | 80/20 | 75/25 | 70/30 | |
| Pigment added, percent | | 10 | 10 | 10 | 10 | 10 | 10 | 10 | 10 | 10 | 10 | 7 |
| Handsheet tests—50 lb. basis weight: | | | | | | | | | | | | |
| Brightness, TAPPI | 80.4 | 83.3 | 78.1 | 78.9 | 80.3 | 79.8 | 82.5 | 82.0 | 82.9 | 82.7 | 83.1 | 81.5 |
| Opacity, TAPPI | 77.5 | 87 | 82.0 | 85 | 85 | 85.5 | 85.5 | 84 | 84.5 | 84.5 | 84.5 | 84.5 |
| Densometer, sec./100 ml | 55 | 74 | 104 | 100 | 126 | 108 | 113 | 94 | 90 | 84 | 96 | 78 |
| Total ash, percent | 0.40 | 6.93 | 6.98 | 6.33 | 5.92 | 5.99 | 5.50 | 5.00 | 4.37 | 4.20 | 3.85 | 4.89 |
| Filler sheet, percent | | 7.29 | 7.72 | 6.95 | 6.50 | 6.59 | 6.07 | 5.55 | 4.83 | 4.65 | 4.25 | 5.01 |
| Pigment tests: | | | | | | | | | | | | |
| Dry brightness | | 88.9 | 80.5 | 81.0 | 82.5 | 83.0 | 85.2 | 85.8 | 86.4 | 86.7 | 87.2 | 88.9 |
| pH of 1% slurry | | 8.6 | 8.9 | 9.4 | 8.4 | 8.6 | 8.4 | 9.0 | 9.0 | 9.0 | 9.1 | 8.6 |
| Ignition loss | | 10.36 | 14.67 | 14.8 | 15.1 | 15.2 | 16.0 | 17.0 | 17.8 | 18.35 | 18.7 | 10.36 |
| Efficiency (closed) | | 47.3 | 31.9 | 40.5 | 44.4 | 43.0 | 50.7 | 51.7 | 61.9 | 62.8 | 70.1 | 57.5 |
| Percent retention (closed) | | 80.2 | 84.9 | 76.5 | 71.6 | 72.5 | 66.8 | 64.1 | 53.1 | 51.2 | 46.8 | 76.4 |

* High purity treated asbestos from the Union Carbide Corporation.

The data presented in the foregoing Table IV show that brightness reaches a maximum at an asbestos/silicate complex ratio of approximately 90/10, though opacity is a maximum at both a ratio of 93/7 and 90/10. The densitometer value appears to be optimum at about 95/5 but is still high at an asbestos/silicate complex ratio of 90/10.

Comparing the pigments themselves in Table IV, it will be noted that the ignition loss is a straight line function of the pigment composition as is to be expected. The dry brightness appears to increase slowly as the percentage of the silicate complex increases. This property may be useful in pigments other than for paper. It will also be noted that the retention of the pigment falls as the amount of silicate complex in the asbestos/silicate mixture rises to about 20%, but above this level retention appears to level off. Pigmentation efficiency continues to rise. These data indicate that at the 20% level, the anionic pigment has substantially saturated the cationic sites available on the high purity grade of asbestos. Additional pigment beyond this level is held by conventional capillary phenomena and is of lesser pigmentation effectiveness.

EXAMPLE 5

The procedure of Example 1 was followed for the preparation of an asbestos-calcium-organo-alumino-silicate complex pigment substituting, however, an untreated asbestos of commerce, Grade 7 T.F. of the Cary Canadian Mines Ltd.

TABLE V

| | Pigmented fiber prepared with— | |
|---|---|---|
| Trial No | Union carbide asbestos 40 | Cary asbestos 51 |
| Paper tests: | | |
| Brightness (TAPPI) | 82.0 | 78.8 |
| Opacity (TAPPI) | 86.5 | 84.0 |
| Densitometer (sec./100 ml.) | 111 | 62 |
| Percent total ash | 5.86 | 4.84 |
| Percent filler | 6.63 | 5.48 |
| Pigment tests: | | |
| Dry brightness | 85.0 | 79.2 |
| pH | 9.0 | 8.7 |
| Ignition less (AD) | 16.0 | 17.2 |
| Percent efficiency | 48.6 | 49.2 |
| 5% retention | 72.9 | 60.3 |

It is thus seen that a pigmented fiber in accordance with the present invention may be prepared from untreated ordinary asbestos of commerce, although the optical properties thereof are not as favorable as those obtained using high purity asbestos.

EXAMPLE 6

Pilot scale quantities of the asbestos-silicate complex pigmented fiber of the present invention were prepared in a 150 gallon tank equipped with an Alsop double-propeller, high-shear mixer and an Ingersoll-Rand closed centrifugal motor pump operating at 7000–8000 r.p.m. arranged so that the slurry could be recycled through the same tank or delivered to a second tank. Each run started with 4000 grams of air dry high purity asbestos fiber which was slurried with 871 pounds of water using the Alsop high-shear mixer. When a uniform suspension had been obtained, 453 grams of the calcium chloride-starch complex prepared as described in Example 1 was added and agitation continued until a uniform dispersion of the complex resulted. When a uniform dispersion has been obtained, the slurry from the 150-gallon tank was pumped into a second vessel by means of the Ingersoll-Rand high speed pump at a rate of approximately 3.42 gallons of fiber suspension per minute. While pumping the asbestos-calcium chloride-starch complex mixture, a sodium silicate preparation was injected into the shear head of the pump at a rate of approximately 192 cc./minute. To 8000 cc. aliquots of the resulting asbestos-organo-silicate complex drawn from the second tank were added, in 100 cc. portions, a solution of alum prepared by dissolving 53.75 grams of iron-free alum in 1000 cc. of water. Sufficient alum was added to reduce the pH of the slurry to approximately 9. The material thus prepared was designated "Trial No. 44."

A second preparation of pigmented fiber was prepared as Trial No. 50 following generally the same procedure as that described with respect to Trial No. 44. The procedure was modified to provide more intense agitation of the initial asbestos slurry and of the slurry to which the calcium chloride-starch complex was added. To provide this, the asbestos slurry was recycled through the high-speed pump for 15 to 20 minutes before adding the calcium chloride-starch complex. The latter was added by injecting it at the shearing head of the pump. After the calcium chloride complex had been added, the slurry was then pumped into the second holding vessel as described with respect to the Trial No. 44 injecting the sodium silicate solution again at the shearing head. Again sufficient alum was added to aliquots of the resulting pigment to reduce the slurry to a pH of about 9.

In Trial No. 51A, Trial No. 50 was repeated, adding, however, additional iron-free alum to yield a pH of 7. A portion of the material prepared in Trial 51A was dried to bone dryness in an oven, and designated Trial 51B. This material was re-pulped before adding it to the paper furnish to demonstrate the effect of drying the pigmented fiber of this invention on the pigment and papers containing it. The results of testing of the pigmented fiber produced in the foregoing trials are summarized in Table VI below:

TABLE VI

| Trial No. | 44 | 50 | 51A | 51B |
|---|---|---|---|---|
| pH of slurried product | 9 | 9 | 7 | 7 |
| Degree of agitation | Normal | Intense | | |
| Dried, then reslurried | | | No | Yes |
| Paper tests: | | | | |
| Brightness (TAPPI) | 80.1 | 81.2 | 82.6 | 81.4 |
| Opacity (TAPPI) | 82.5 | 84.5 | 84.0 | 83.5 |
| Densitometer (sec./100 ml.) | 60 | 71 | 77 | 65 |
| Total ash, percent | 5.94 | 5.48 | 5.38 | 6.14 |
| Filler, percent | 6.69 | 6.20 | 6.08 | 6.98 |
| Pigment tests: | | | | |
| Dry brightness (TAPPI) | 85.4 | 87.2 | 87.0 | 87.0 |
| pH | 8.8 | 8.8 | 7.5 | 7.5 |
| Ignition loss, percent | 15.8 | 16.5 | 16.4 | 16.4 |
| Efficiency, percent | 38.3 | 45.0 | 47.6 | 39.0 |
| Retention, percent | 73.6 | 68.2 | 66.9 | 76.8 |

A comparison of trials 44 and 50 shows that high shear agitation of the asbestos in combination with high shear addition of both the calcium chloride-starch complex and sodium silicate produced more acceptable optical properties and a high densitometer rating. At the same time, the ash and filler content were reduced.

Comparison of trials 50 and 51A, which differ only in the quantity of alum added, shows increased brightness and densitometer values and a slight loss in opacity, total ash and filler content. The amount of alum added in trial 51A brought the pH of the pigment to its isoelectric point. Comparison of trials 51A and 51B, which differ only in the drying of the pigment, shows that drying causes a slight but negligible loss in the optical properties and densitometer value of paper prepared using the pigment. There is an increase in total ash and filler content. Comparison of the pigments per se shows some loss of efficiency but a gain in retention by the dried pigment.

EXAMPLE 7

Trials 52 and 55 were made with pigments prepared from $CaCl_2$, $BaCl_2$, $MgCl_2$, and $AlCl_3$ in the same stoichiometric amount as the $CaCl_2$ added in the form of a $CaCl_2$-starch complex in Example 1, or stated in another way, these trials were made and the products tested according to the method of Example 1, substituting an equimolar quantity of $CaCl_2$, $BaCl_2$, $MgCl_2$ or $AlCl_3$ for the calcium chloride-starch complex of that example. The results obtained with handsheets calculated to basis weight 50 lb. are compared in Table XII below with those of standard asbestos-calcium-organoalumino silicate complex.

TABLE VII

| | Asbestos/organo-silicate complex pigment | Pigments prepared without starch | | | |
|---|---|---|---|---|---|
| | | $Ca^{++}$ | $Ba^{++}$ | $Mg^{++}$ | $Al^{+++}$ |
| Trial No. | 40 | 52 | 53 | 54 | 55 |
| Paper tests: | | | | | |
| Brightness (TAPPI) | 82.0 | 82.6 | 82.8 | 83.5 | 83.3 |
| Opacity (TAPPI) | 86.5 | 86.0 | 86.5 | 86.0 | 86.0 |
| Densitometer (sec./100 ml.) | 111 | 117 | 105 | 88 | 107 |
| Total ash, percent | 5.86 | 5.55 | 5.87 | 4.23 | 4.43 |
| Filler, percent | 6.63 | 6.22 | 6.57 | 4.73 | 4.91 |
| Pigment tests: | | | | | |
| Dry brightness (TAPPI) | 85.0 | 84.6 | 85.1 | 85.7 | 84.3 |
| pH | 9.0 | 8.6 | 9.0 | 7.9 | 3.7 |
| Ignition loss (AD), percent | 16.0 | 15.6 | 15.3 | 15.7 | 15.9 |
| Efficiency, percent | 48.6 | 50.7 | 49.1 | 68.9 | 64.7 |
| Retention, percent | 72.9 | 68.4 | 72.4 | 52.0 | 54.9 |

Thus it is shown that when calcium chloride, barium chloride, magnesium chloride and aluminum chloride are used in preparation of starch-free pigment complexes (of U.S. Pat. No. 2,935,438), the complexes formed produce slightly better brightness (compare trial 40) in paper, while dry brightness of the pigment varies slightly plus or minus from that of the pigment containing starch. Paper brightness, likewise, is slightly higher for the pigment without the starch. However, densitometer values are lower for three of the inorganic complexes, one being appreciably lower. Total ash and percent filler in the paper is one third lower for magnesium and aluminum silicates.

Pigment tests show that the asbestos-inorganic silicate pigments display higher percent efficiency—appreciably higher in magnesium and aluminum silicates—with appreciably lower percent retention, while retention of calcium and barium silicates is similar to that of the calcium chloride-starch based pigment. As a matter of fact, retention and efficiency of the all-inorganic asbestos-calcium silicate pigment are lower than in the asbestos-calcium-organo-aluminosilicate pigment.

I claim:
1. A method of producing a pigment which is a metallo-alumino-silicate complex precipitated in, around and on fibrous mineral silicates comprising
   (a) dispersing in water a fibrous mineral silicate selected from the group consisting of magnesium silicate and magnesium aluminum silicate and a member selected from the group consisting of a metal halide selected from the group consisting of calcium, barium, magnesium and aluminum, and complexes of said metals with starch containing between about 1.58% and 15.8% starch;
   (b) reacting therewith a solution of a soluble silicate to form a precipitated silicate pigment in, around and on said fibrous mineral silicate, said solution containing less than 30% by weight of said soluble silicate; and
   (c) thereafter adding aluminum sulfate to said silicate pigment, the amount of aluminum sulfate used being sufficient to yield a pigment which when dispersed in water at a concentration of 1% by weight is characterized by a pH within the range of about 7.5 to 10; said pigment containing from about 50% by weight to about 97% by weight of said fibrous mineral silicate.

2. A process according to claim 1 wherein said fibrous mineral silicate is asbestos, said soluble silicate is sodium silicate, and said metal halide is calcium chloride.

3. A process according to claim 2 wherein said fibrous mineral silicate is a cationic asbestos.

4. A process according to claim 2 wherein said calcium halide-starch complex is reacted with said soluble silicate in a zone of intense agitation, and said precipitated calcium silicate-starch complex is reacted with said aluminum sulfate in a zone of intense agitation.

5. A process according to claim 2 wherein the concentration of the calcium chloride-starch complex is between about 1.8% and 5.4% by weight combined calcium and said complex contains between about 3.15% and 6.3% by weight combined calcium.

6. A process according to claim 2 wherein the concentration of the sodium silicate is between about 5% and 15% by weight and the amount thereof is sufficient to provide substantially 3 gram molecular weights of combined silicon dioxide for each gram atomic weight of combined calcium.

7. A process according to claim 2 wherein the pigment contains from 80% to 95% by weight of said fibrous mineral silicate.

8. A pigment prepared in accordance with claim 2.

References Cited

UNITED STATES PATENTS

| | | |
|---|---|---|
| 2,573,677 | 11/1951 | Craig. |
| 2,823,997 | 2/1958 | Craig _____ 106—306X |
| 2,824,099 | 2/1958 | Craig. |
| 2,935,438 | 5/1960 | Craig. |
| 3,471,438 | 10/1969 | Chwastiak _____ 106—308X |

TOBIAS E. LEVOW, Primary Examiner

H. M. SNEED, Assistant Examiner

U.S. Cl. X.R.

106—288, 308; 162—153